United States Patent Office 3,704,162
Patented Nov. 28, 1972

3,704,162
SUBBING COMPOSITION FOR POLYESTER FILMS
Koji Oshibuchi, Motoo Kogure, Masaru Kanbe, and Nobuo Harajima, Tokyo, Japan, assignors to Keuffel & Esser Company, Morristown, N.J.
No Drawing. Filed Nov. 17, 1970, Ser. No. 90,439
Claims priority, application Japan, Nov. 20, 1969, 44/92,478
Int. Cl. G03c 1/80
U.S. Cl. 117—76 F
9 Claims

ABSTRACT OF THE DISCLOSURE

Polyester films are rendered acceptable of adherent layers by a coating of a subbing composition which includes a mixture of gelatin and a phenol derivatives with a polymer comprising units of a halogen-containing acrylic acid derivative. The subbing presents a hydrophilic surface which is receptive of polymeric coating compositions or aqueous coatings of silver halide or diazotype photographic compositions.

BACKGROUND OF THE INVENTION

Polyester films such as those derived from polyethylene terephthalate present a surface which is difficult to coat with many types of compositions, particularly hydrophilic coating compositions and similar formulations employed in the preparation of photographic materials. Such compositions, including gelatin, polyvinyl alcohol and the like, provide very limited adherence to the noted polyester films.

In an attempt to overcome the problems of adherence associated with polyester films, the art has for some time employed subbing layers which for the most part accomplish a gradual transition from the hydrophobic characteristics of the polyester film surface to the hydrophilic characteristics of the final coating, for example a photographic gelatin composition. Some useful procedures have included the use of multiple layers; however, the more preferred practice is to employ a single composition which is capable of presenting good adherence characteristics with respect to both polyester surfaces and hydrophilic coating compositions. Typical of practices employed prior to the present invention is the use of vinylidene copolymer coatings such as described in U.S. 2,627,088. Various adaptations of the use of such terpolymers appear also in U.S. 2,698,240; U.S. 2,852,378; and U.S. 2,943,937.

In U.S. 3,053,661 there is described a particular type of subbing composition for polyester films which includes the combination of the aforementioned terpolymer with gelatin and a dissolving or dispersing agent for the gelatin, this latter component being generally selected from phenolic derivatives. This subbing composition, however, has been found to exhibit a limited compatibility between the gelatin and polymeric components and because of this is deemed to be excessively subject to separation in the components which adversely effects the bonding between the polyester film and any of the numerous types of coatings which are applied thereto.

SUMMARY

In accordance with the present invention there is provided a coating composition which may be employed as a subbing for polyester films and which provides a particularly compatible blend of polymeric components and hydrophilic materials such as gelatin. The subbing composition generally comprises a combination of a homopolymer of a halogen-containing acrylic acid derivative or a copolymer of such a derivative with an ethylenically unsaturated polymerizable monomer compound blended with gelatin and a gelatin-dispersing or -dissolving agent. Coating such a composition out of a suitable solvent or carrier vehicle onto the surface of a polyester film provides an exceptionally stable, adherence-improving layer particularly adapted to receive hydrophilic materials such as aqueous coating compositions.

The improvement obtained through the use of the halogen-containing acrylic acid derivatives as a component in the subbing composition of the present invention as compared, for example, with the subbing composition described in the aforementioned 3,053,661, can readily be observed in a simple test which exhibits the difference in the susceptibility of the hydrophilic gelatin component to being extracted or leached from the subbing composition by aqueous media, such as water-based coating compositions. To effect such a comparison, specimens of polyester film bearing respectively a subbing composition of the present invention and of the aforementioned 3,053,661 may be boiled in water for a short time and then contacted with a dye capable of coloring the gelatin component. As a result of such a treatment, it can clearly be seen that a substantial portion of the hydrophilic gelatin, component may be removed from the layer described in the patent while the layer of the present invention retains substantially all of its hydrophilic component.

In accordance with the present invention the halogen-containing component is selected from polymers derived from a monomer having the general formula:

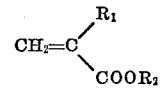

wherein $R_1$ is a hydrogen atom, a lower alkyl group or a halogen atom, and $R_2$ is a lower alkyl group or a halogenated lower alkyl group, at least one of said $R_1$ and $R_2$ containing a halogen atom. Such polymers may, as noted, either be homopolymers of an indicated monomer or a copolymer of such a monomer with other polymerizable ethylenically unsaturated compounds.

DESCRIPTION OF THE INVENTION

Homopolymers of monomers represented by the above-mentioned formula, in which neither of $R_1$ and $R_2$ contains a halogen atom, and copolymers of such a monomer with other polymerizable ethylenically unsaturated compounds, are extremely low in compatibility with gelatin even in the presence of a gelatin-dissolving agent, but homopolymers of monomers represented by the formula, in which at least one of $R_1$ and $R_2$ contains a halogen atom, and copolymers of such a monomer with other polymerizable ethylenically unsaturated compounds, show excellent gelatin compatibility in the presence of a gelatin-dissolving agent.

Typical examples of the monomer represented by the aforesaid general formula include chloromethyl methacrylate, chloromethyl acrylate, 2-chloroethyl methacrylate, 2-chloroethyl acrylate, 1-chloroethyl methacrylate, 1-chloroethyl acrylate, 1,2-dichloroethyl methacrylate, 1,2-dichloroethyl acrylate, 2,3-dichloropropyl methacrylate, 2,3-dichloropropyl acrylate, 2,2'-dichloroisopropyl-1-methacrylate, 2,2'-dichloroisopropyl-1-acrylate, 1,2,2,2-tetrachloroethyl methacrylate, methyl - α - chloroacrylate and 2-chloroethyl-α-chloroacrylate, though these are not limitative.

Typical examples of useful polymerizable ethylenically unsaturated comonomer compounds include acrylic acid, methacrylic acid, α-chloroacrylic acid, itaconic acid, itaconic anhydride, maleic anhydride, acrylamide, N-acryloyl glycine, N-acryloyl-β-alanine, methyl acrylate, ethyl acrylate, propyl acrylate, butyl acrylate, methyl methacrylate, ethyl methacrylate, propyl methacrylate, butyl methacrylate, phenyl acrylate, phenyl methacrylate, benzyl acrylate, benzyl methacrylate, phenethyl acrylate, phenethyl methacrylate, cyclohexyl methacrylate, 2-hydroxyethyl methacrylate, vinyl acetate, vinyl chloroacetate, vinyl benzoate, 2-chloro-ethyl vinyl ether, vinyl chloride, vinylidene chloride, styrene, o-chlorostyrene, p-chlorostyrene and acrylonitrile.

The gelatin-dissolving agent used in the present invention is (a) a compound which itself can dissolve gelatin or (b) a compound which, when incorporated into an organic solvent incapable of dissolving gelatin, can provide a property of dissolving gelatin. Examples of the gelatin-dissolving agent include phenols such as phenol, o-cresol, m-cresol, p-cresol, o-chlorophenol, p-chlorophenol, dichlorophenol, trichlorophenol, o-phenylphenol, p-phenylphenol and salicylic acid; dihydroxybenzenes such as resorcinol, methylresorcinol and chlororesorcinol; acetic acids such as acetic acid, monochloroacetic acid, dichloroacetic acid, trichloroacetic acid, trifluoroacetic acid, chloropropionic acid and dichloropropionic acid; and benzoic acids such as benzoic acid, chlorobenzoic acid. These may be used either singly or in admixture.

For the control of viscosity, surface activity and the like of the coating composition, common solvents may be employed. Examples of such solvents include halogenated hydrocarbons such as methylene chloride, ethylene dichloride, methylene chlorobromide, chloroform, methylchloroform, 1,1,2 - trichloroethane, 1,1,2,2 - tetrachloroethane, trichloroethylene, tetrachloroethylene and monochlorobenzene; cyclic ethers such as tetrahydrofuran and dioxane; ethers and esters such as ethyl acetate, butyl acetate, ethyl propionate, ethyl lactate and amyl acetate; alcohols usable in admixture therewith such as methanol, ethanol and isopropanol; aromatic alcohols and ethers such as benzyl alcohol and anisole; and aromatic compounds such as benzene and toluene. These organic solvents may be used either singly or in admixture.

Subbing compositions according to the present invention may be readily prepared by simple combination of the components in any usual manner employed in the art. The mixing proportions of the gelatin and the selected polymer vary depending on the kind of polymer, but favorable results can be obtained if the amount of the polymer component based on the total solids is 30 to 70% in the case of a homopolymer of the monomer represented by the aforesaid formula; 20 to 96% in the case of a polymer containing 0.1 to 5 mol percent of a carboxylic acid-containing monomer; and 50 to 96% in the case of a polymer containing more than 5 mol percent of a carboxylic acid-containing monomer. The amount of the polymer in the subbing composition may be in the range of 0.1 to 30%, preferably 0.3 to 10%, and the content of the gelatin-dissolving agent in the subbing composition may be in the range of 1.5 to 30%.

PREFERRED EMBODIMENTS

Example 1

A solution of 0.6 part of polychloromethyl methacrylate in 90 parts of ethylene chloride was incorporated with 10 parts of phenol and 4 parts of a 10% gelatin-o-cresol solution to prepare a subbing composition. This subbing composition was coated on a polyester film base and then dried at 80° C. for about 2 minutes to form a sub layer. A silver halide emulsion was coated on said sub layer and dried to obtain a sample. The thus obtained sample was subjected to tape adhesion test carried out by adhering a cellophane adhesive tape onto the sample and then strongly peeled off from the sample, whereby the said sub layer and the light-sensitive layer were not peeled off at all and showed excellent adhesiveness.

Example 2

A solution of 0.5 part of a methyl-α-chloroacrylate/methyl acrylate/itaconic anhydride (65/30/5) copolymer in 90 parts of methylene chlorobromide was incorporated with 3 parts of p-chlorophenol and 5 parts of a solution comprising 50 parts of phenol, 50 parts of ethylene chloride, 10 parts of glacial acetic acid and 10 parts of gelatin to prepare a subbing composition. The subbing composition was coated on a polyester film base and then dried at 90° C. for about 2 minutes to form a sub layer. On the thus formed sub layer, gelatin was coated, followed by drying, to form an anti-halation gelatin layer. This gelatin layer passed the tape adhesion test of Example 1.

Example 3

A solution of 0.7 part of a 2-chloroethyl methacrylate/acrylic acid (97.5/2.5) copolymer in 50 parts of chloroform was incorporated with 15 parts of phenol and 3 parts of a 10% gelatin-acetic acid solution. The resulting solution was further incorporated with 40 parts of methanol to prepare a subbing composition. The subbing composition was coated on a polyester film base and then dried at 85° C. to form a sub layer. On this sub layer a silver halide emulsion and gelatin were coated in this order, followed by drying, to form an emulsion layer and a protective gelatin layer. The thus formed layers showed excellent adhesiveness to the polyester film base, and passed the tape adhesion test of Example 1. The above-mentioned sub layer did not give any photographical detrimental effect to the silver halide emulsion layer.

Example 4

1 part of gelatin was dissolved at 70° C. in a mixture comprising 15 parts of ethylene chloride, 15 parts of phenol and 0.5 part of acetic acid. This solution was diluted with a mixture of 45 parts of ethylene chloride and 25 parts of toluene and then incorporated with 1 part of a 2,2' - dichloroisopropyl - 1 - methacrylate/acrylonitrile/itaconic acid (85/10/5) copolymer to prepare a subbing composition. The subbing composition was coated on a polyester film base and then dried at 90° C. for about 2 minutes to form a sub layer. On this sub layer a silver halide emulsion was coated, followed by drying, to form an emulsion layer. The thus formed layers showed excellent adhesiveness to the polyester film base, and passed the tape adhesion test of Example 1.

Example 5

A solution of 0.4 part of an ethyl-α-chloroacrylate/itaconic acid (85/15) copolymer in 80 parts of ethylene chloride was incorporated with 1 part of acetic acid, 10 parts of phenol and 6 parts of a 10% gelatin-o-cresol solution to prepare a subbing composition. The subbing composition was coated on a polyester film base and then dried at 75° C. for about 2 minutes to form a sub layer. On the thus formed sub layer was coated a 1% aqueous gelatin solution incorporated with a small amount of a gelatin-hardening agent, followed by drying, to form a layer. On this layer was further coated a silver halide emulsion, followed by drying, to form an emulsion layer. All of the thus formed layers showed excellent mutual adhesion, and passed the tape adhesion test of Example 1.

What is claimed is:
1. Coating support material comprising a polyester film having a normally hydrophobic, difficultly coatable surface, and a layer coated thereon of a subbing composition comprising an intimate mixture of:
(a) gelatin;
(b) a gelatin-dissolving agent; and
(c) a polymer comprising units of an acrylic acid derivative of the general formula:

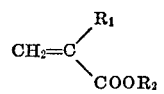

wherein $R_1$ is a hydrogen atom, a lower alkyl group or a chlorine atom, and $R_2$ is a lower alkyl group or chlorinated lower alkyl group, at least one of said $R_1$ and $R_2$ containing a chlorine atom.

2. Material according to claim 1 wherein said gelatin-dissolving agent is a compound selected from the group consisting of mono- and dihydroxy benzenes, lower alkyl carboxylic acids, benzoic acids, and derivatives thereof.

3. Material according to claim 2 wherein said polymer is a homopolymer of said acrylic acid derivative.

4. Material according to claim 2 wherein said polymer is a copolymer of said acrylic acid derivative with at least one polymerizable ethylenically unsaturated compound.

5. Material according to claim 1 wherein said mixture comprises:
   (a) 4 to 80 parts by weight of gelatin;
   (b) 20 to 300 parts by weight of said gelatin-dissolving agent; and
   (c) 20 to 96 parts by weight of said polymer.

6. Sheet material comprising a support according to claim 1 and, adherent thereto, a layer of a composition comprising a hydrophilic film former.

7. Sheet material comprising a support according to claim 1 having coated thereon a layer of a hydrophilic composition.

8. Material according to claim 7 wherein said layer is the dried residue of an aqueous dispersion of said composition.

9. Material according to claim 1 wherein said gelatin-dissolving agent is selected from the group consisting of mono- and di-hydroxy benzenes and halogenated derivatives thereof.

References Cited

UNITED STATES PATENTS

| | | | |
|---|---|---|---|
| 3,586,508 | 6/1971 | Fowler et al. | 96—87 R |
| 3,053,661 | 9/1962 | Starck et al. | 96—87 R |
| 3,143,421 | 8/1964 | Nadeau et al. | 96—87 R |

RONALD H. SMITH, Primary Examiner

U.S. Cl. X.R.

96—75, 87 R; 117—34, 138.8 F, 161 UC, 161 UB, 164